United States Patent

Kang

[11] Patent Number: 5,959,491
[45] Date of Patent: Sep. 28, 1999

[54] APPARATUS AND METHOD FOR NOISE SUPPRESSION IN A BALANCED MODULATING DEVICE

[75] Inventor: Jae-sung Kang, Pucheon, Rep. of Korea

[73] Assignee: Samsung Electronics, Co., Ltd., Suwon, Rep. of Korea

[21] Appl. No.: 08/961,599

[22] Filed: Oct. 31, 1997

[30] Foreign Application Priority Data

Oct. 31, 1996 [KR] Rep. of Korea .................. 96-51481

[51] Int. Cl.⁶ ........................................... G06F 7/44
[52] U.S. Cl. ........................ 327/359; 327/357; 327/552
[58] Field of Search .................................... 327/355–357, 327/359, 379, 551, 552, 556–559; 330/258; 455/333; 348/607, 622, 624, 642

[56] References Cited

U.S. PATENT DOCUMENTS

4,755,767   7/1988   Yamatake ................................ 330/257
5,512,857   4/1996   Koskowich ............................. 330/252

Primary Examiner—Kenneth B. Wells
Attorney, Agent, or Firm—Marger Johnson & McCollom, P.C.

[57] ABSTRACT

A circuit and method are shown for suppressing a common-mode noise signal in a pair of differential balanced-modulated color signals. A complementary balanced-modulated color signal, which includes the common-mode noise signal, inverse modulates a first current in a first transistor which is connected in series with a second transistor. The second transistor sinks a second current responsive to a common base current. A balanced-modulated color signal, which also includes the common-mode noise signal, inverse modulates the current in a third transistor which is connected in series with a fourth transistor. The fourth transistor sinks a fourth current responsive to the common base current. The common base current is produced by driving a fifth transistor with the first current less the second current signal. An output signal that is free of the common mode noise signal is produced by subtracting the fourth current from the third current.

5 Claims, 3 Drawing Sheets

APPARATUS AND METHOD FOR NOISE SUPPRESSION IN A BALANCED MODULATING DEVICE

BACKGROUND OF THE INVENTION

1. Field of the Invention

The present invention relates to a device for removing common-mode noise which is introduced into a balanced modulated color signal by a switching operation of a Gilbert multiplier in a balanced chrominance modulator.

2. Description of the Related Art

Figure 1:
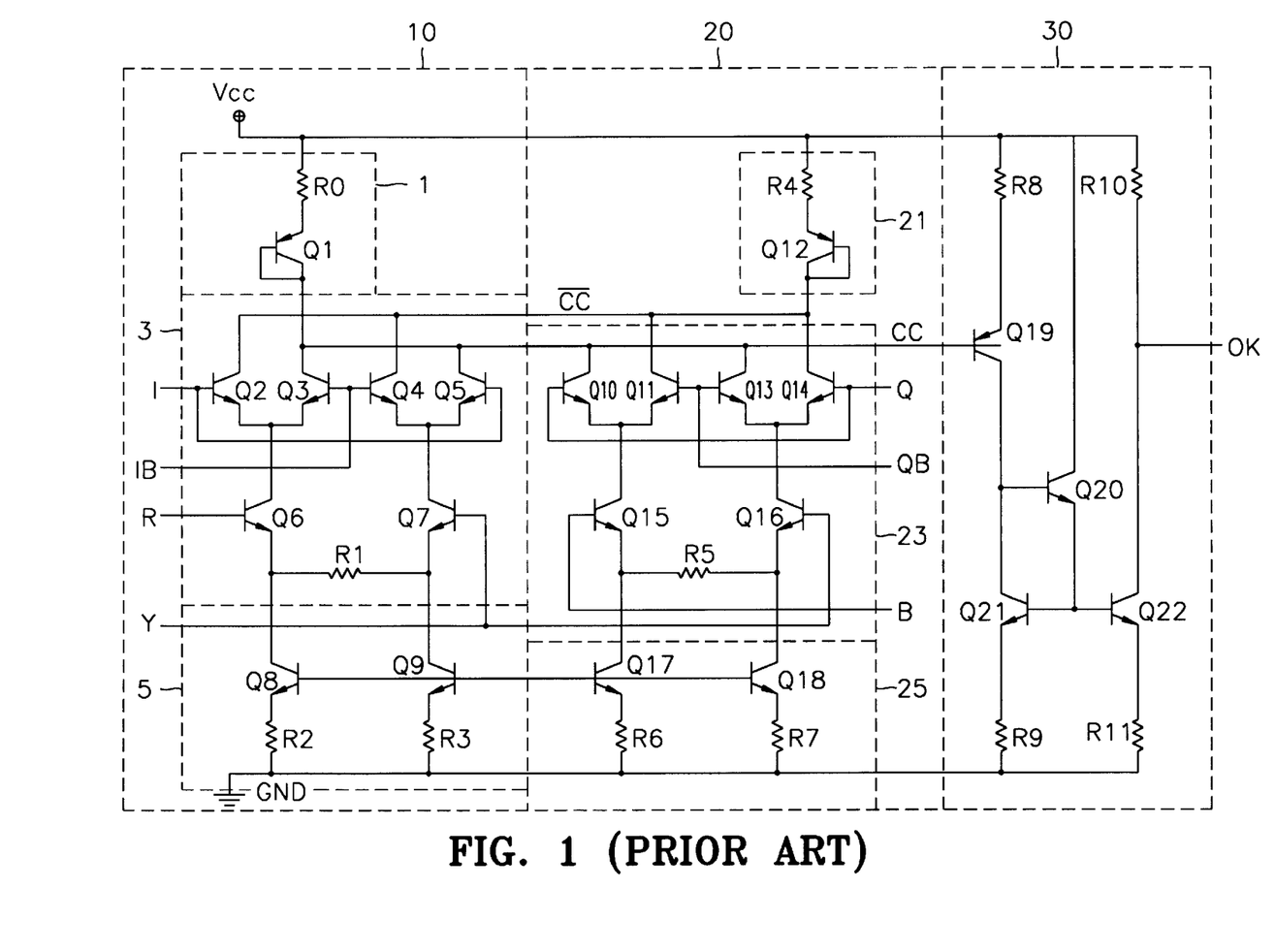
FIG. 1 is a circuit diagram of a conventional balanced modulating device employing a Gilbert multiplier.

FIG. 1 is a circuit diagram for a conventional balanced modulating device using a Gilbert multiplier. In FIG. 1, reference numeral 10 denotes a R-Y modulating circuit, reference numeral 20 denotes a B-Y modulating circuit, reference numeral 30 denotes a chrominance amplifying circuit, reference numerals R0–R11 denote resistors, and reference numerals Q1–Q22 denote transistors.

The R-Y modulating circuit 10 includes an active load 1 connected to a power source Vcc for supplying current and a biasing circuit 5. The R-Y modulating circuit 10 also includes a modulator 3 that receives a red chrominance signal R, a luminance signal Y, and a carrier signal I, along with its complementary signal IB, and modulates these inputs in order to produce a R-Y color difference signal. The active load 1 includes a resistor R0 connected between the power source Vcc and the collector of a transistor Q1 whose base and collector are connected to each other, i.e. Q1 is diode-connected. The modulator 3 is composed of a Gilbert multiplier which has a very small modulation gain. The biasing circuit 5 includes transistors Q8 and Q9 whose bases are commonly connected, and resistors R2 and R3 which are connected between the emitters of transistors Q8 and Q9, respectively, and a ground terminal.

The B-Y modulating circuit 20 has an active load 21 connected to the power source Vcc for supplying current and a biasing circuit 25. The B-Y modulating circuit 20 also includes a modulator circuit 23 that receives a blue chrominance signal B, the luminance signal Y, and another carrier signal Q, along with its complement QB, and modulates these input signals to produce a B-Y color difference signal. The active load 21 includes a resistor R4 connected between the power source Vcc and the collector of a diode-connected transistor Q12. The modulator 23 is composed of a Gilbert multiplier circuit which has a very small modulation gain. The biasing circuit 25 includes transistors Q17 and Q18 whose bases are commonly connected and resistors R6 and R7 which are connected between the emitters of transistors Q17 and Q18, respectively, and the ground terminal.

The R-Y color difference signal generated in the R-Y modulating circuit 10 and the B-Y color difference signal generated in the B-Y modulation circuit 20 are vector-synthesized into a pair of differential balanced-modulated color signals CC and CCB, where CCB is the complementary signal to signal CC and where the signal CC can be expressed by:

$$CC=(B-Y)+j(R-Y).$$

The chrominance amplifying circuit 30 receives the balanced-modulated color signal CC, amplifies it at a predetermined gain, and outputs an amplified modulated color signal OK.

Figure 3A:
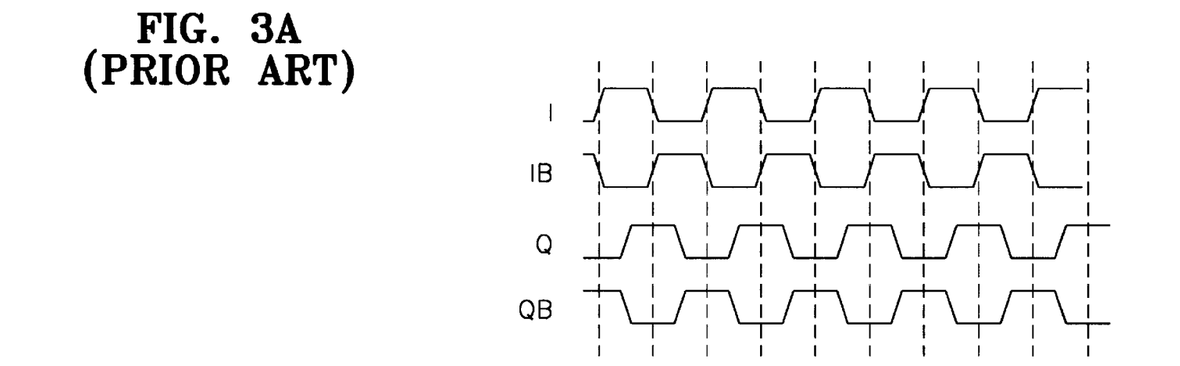
FIG. 3A is a waveform diagram which illustrates the waveforms of signals which are input to the devices shown in FIGS. 1 and 2.

However, when vector-synthesizing the R-Y and B-Y color difference signals in accordance with the above equation, noise generated during the switching operation of the transistors within modulators 3 and 23 is also input to the chrominance amplifying circuit 30 and amplified. Thus, the amplified modulated color signal OK contains amplified noise, as shown in FIG. 3C, which results in Y/C interference phenomenon. For example, when a white line is to be displayed on a screen, that line will appear to be colored.

SUMMARY OF THE INVENTION

To solve the above problem, an object of the present invention is to provide a noise suppressing circuit which can prevent Y/C interference phenomenon.

To achieve the above object, there is provided a noise suppressing circuit for removing a common-mode noise component signal included in a modulated color signal generated by a balanced modulating device employing a Gilbert multiplier, wherein the noise suppressing circuit includes a first transistor having a base is configured to receive a complementary balanced-modulated signal generated by the balanced modulating device and where a first resistor is coupled between a power terminal and the emitter of the first transistor. A second transistor has a base configured to receive a balanced-modulated signal generated by the balanced modulating device and a second resistor is coupled between the power terminal and the emitter of the second transistor. A third transistor is included wherein the base of the third transistor is coupled to the collector of the first transistor and the collector of the third transistor is coupled to the power terminal. A fourth transistor has a collector that is coupled to the collector of the first transistor and a base that is coupled to the emitter of the third transistor and a third resistor is coupled between the emitter of the fourth transistor and a ground terminal. A fifth transistor has a collector coupled to the collector of the second transistor and a base that is coupled to the base of the fourth transistor. A fourth resistor is coupled between the emitter of the fifth transistor and the ground terminal.

There is also a method according to the present invention provided for suppressing a common-mode noise signal included in a pair of differential balanced-modulated color signals generated by a balanced modulating device employing a Gilbert multiplier, where the method includes inverse modulating a first current signal responsive to a complementary balanced-modulated color signal containing the common-mode noise signal and inverse modulating a second current signal responsive to a balanced-modulated color signal containing the common-mode noise signal. The method also includes generating a common base current signal responsive to the first current signal, driving a first current sink with the common base current signal to produce a third current signal, and subtracting the third current signal from the first current signal. The method then involves driving a second current sink with the common base current signal to produce a fourth current signal and subtracting the fourth current signal from the second current signal in order to produce an output signal.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 2:
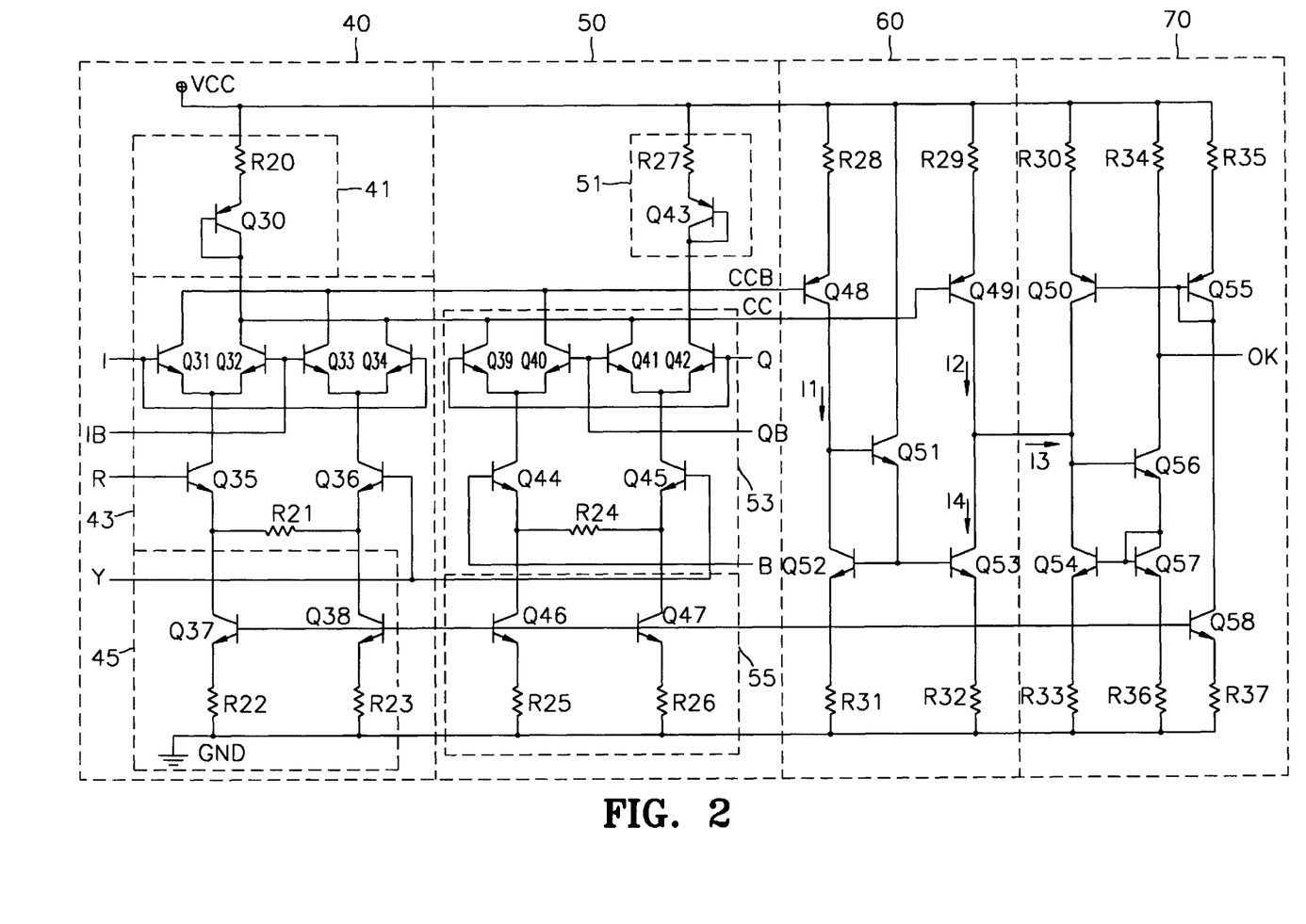
FIG. 2 is a circuit diagram of a balanced modulating device to which a noise suppressing device of the present invention is applied.

Referring to FIG. 2, reference numeral 40 denotes a R-Y modulating circuit, reference numeral 50 denotes a B-Y modulating circuit, reference numeral 60 denotes a noise suppressing circuit, reference numeral 70 denotes a chrominance amplifying circuit, reference numerals R20–R37 denote resistors, and reference numerals Q30–Q58 denote transistors.

The R-Y modulating circuit 40 includes an active load 41 connected to a power source Vcc for supplying current, a modulator 43 for performing a R-Y modulation, and a biasing circuit 45. The active load 41 has a resistor R20 connected between the power source Vcc and the collector of a diode connected transistor Q30. The modulator 43 is composed of a Gilbert multiplier which has a very small modulation gain. The biasing circuit 45 includes transistors Q37 and Q38 whose bases are commonly connected and resistors R22 and R23 which are connected between the emitter of transistor Q37 and Q38, respectively, and a ground terminal.

The B-Y modulating circuit 50 includes an active load 51 connected to the power source Vcc for supplying current, a modulator 53 for performing a B-Y modulation, and a biasing circuit 55. The active load 51 includes a resistor R27 connected between the power source Vcc and the collector of a diode connected transistor Q43. The modulator 53 is composed of a Gilbert multiplier which has a very small modulation gain. A biasing circuit 55 includes transistors Q46 and Q47, whose bases are commonly connected, and resistors R25 and R26, which are connected between the emitter of transistor Q46 and transistor Q47, respectively, and the ground terminal.

The noise suppressing circuit 60 includes a PNP transistor Q48 wherein the base of transistor Q48 receives the complementary balanced-modulated color signal CCB while the emitter is connected to the power source Vcc via a resistor R28. The base of PNP transistor Q49 receives the balanced-modulated color signal CC while the emitter of transistor Q49 is connected to the power source Vcc via a resistor R29. The base of NPN transistor Q51 is connected to the collector of the PNP transistor Q48 while its collector is connected to the power source Vcc. The collector of NPN transistor Q52 is connected to the collector of the PNP transistor Q48 while the emitter of transistor Q52 is connected to the ground terminal via a resistor R31 and the base of transistor Q52 is connected to the emitter of the transistor Q51. The collector of NPN transistor Q53 is connected to the collector of the transistor Q49 while the base of transistor Q53 is connected to the base of the transistor Q52 and the emitter of Q53 is connected to the ground terminal via a resistor R32.

The noise suppressing circuit 60 removes common-mode noise signals present in the balanced-modulated color signal CC and the complementary balanced-modulated color signal CCB. In other words, the noise signal components generated when the transistors of the R-Y and B-Y modulating circuits 40 and 50 are switched appear in-phase with one another in the balanced-modulated color signal CC and the complementary balance-modulated color signal CCB.

The noise suppressing operation of noise suppressing circuit 60 will now be described in further detail. A current I1 flowing through the transistor Q48 and a current I2 flowing through the transistor Q49 are modulated by the complementary balanced-modulated color signal CCB and the balance-modulated color signal CC, respectively, and therefore also contain the common mode noise introduced by transistor switching as described above. Transistor Q48, because it is a PNP device, inverts the modulating signal and the signal CCB and the common-mode noise component are inverted in current signal I1. Similarly, transistor Q49 is also a PNP device and the signal CC and the common-mode noise component are inverted in current signal I2.

The transistors Q52 and Q53 each receive the same base current generated by transistor Q51 and therefore both conduct the same current signal which causes current I4 to contain the inverted CCB signal and inverted common-mode noise component of the current I1. Since current signal I3 is obtained by subtracting current signal I4 from current signal I2, the common-mode noise component contained in the current I2 is matched and cancelled by the common mode noise component present in current I4 flowing through the transistor Q53, and current I3, which is free of the common-mode noise component, flows into the chrominance amplifying circuit 70. The chrominance amplifying circuit 70 receives the noise-free signal I3 of the balanced-modulated color signal CC, amplifies the signal I3 at a predetermined gain, and outputs an amplified modulated color signal OK.

The chrominance amplifying circuit 70 includes a PNP transistor Q50 which has its emitter connected to the power terminal Vcc via the resistor R30. An NPN transistor Q56 has its collector connected to the power terminal Vcc via a resistor R34 and has its base connected to the emitter of the transistor Q50. An NPN transistor 54 has its collector connected to the base of the transistor Q56. A diode connected NPN transistor Q57 has its collector and base connected to the emitter of the transistor Q56 and the base of the transistor Q54. The emitter of transistor Q54 is connected to the ground terminal via a resistor R36. A diode connected PNP transistor Q55 has its emitter connected to the power terminal Vcc via resistor R35 and its base and collector are connected to the base of the transistor Q50. An NPN transistor 58 has its collector connected to the collector of the transistor Q55, its base is connected to the base of the transistor Q47, and its emitter is connected to the ground terminal via a resistor R37. In operation, the chrominance amplifying circuit 70 receives the input current signal I3 and amplifies it at a predetermined gain. At this time, the dynamic range of the chrominance amplifying circuit 70 is determined by the current flowing through the transistor Q55, which is, in turn, determined by the supply voltage and the resistance of resistors R35 and R37.

The overall operation of the device shown in FIG. 2 will now be described. The R-Y modulating circuit 40 performs an R-Y modulation by multiplying carrier signals I and IB shown in FIG. 3A by the input signals R and Y in order to obtain the R-Y color difference signal that is integrated into the differentially input balanced-modulated color signals CC and CCB. The B-Y modulating circuit 50 performs a B-Y modulation by multiplying carrier signals Q and QB shown in FIG. 3A by input signals B and Y in order to produce the B-Y color difference signal that is integrated into the differentially input balanced-modulated color signals CC and CCB. Subsequently, the R-Y and B-Y color difference signals generated in the R-Y and B-Y modulating circuits 40 and 50, respectively, are vector-synthesized according to the following equation and output as the differential balanced-modulated signals CC and CCB as shown in FIG. 3B.

$$CC=(B-Y)+j(R-Y).$$

Figure 3B:
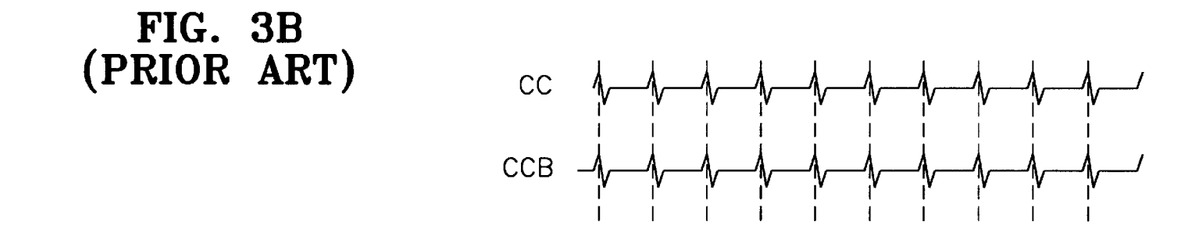
FIG. 3B is a waveform diagram which illustrates the waveforms of signals generated within the devices shown in FIGS. 1 and 2 responsive to the inputs of FIG. 3A.
Figures 3C, 3D:
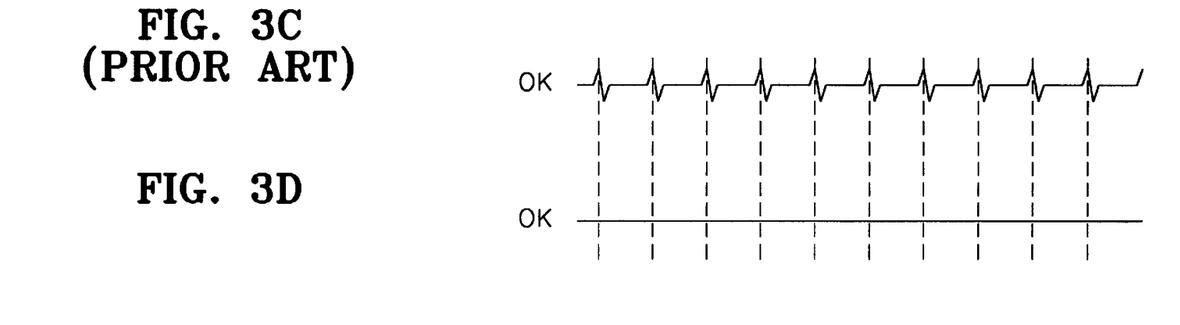
FIG. 3C is a waveform diagram which illustrates the waveform of the output signal generated by the conventional device shown in FIG. 1.
FIG. 3D is a waveform diagram which illustrates the waveform of the output signal generated by the device of the present invention shown in FIG. 2.

As discussed above with regard to the conventional device of FIG. 1, when the R-Y and B-Y color difference signals are being vector-synthesized, a common-mode noise signal is generated in the differential balanced-modulated color signals CC and CCB, as shown in FIG. 3B, due to the switching of each transistor of R-Y and B-Y modulating circuits 40 and 50. In the circuit of the present invention shown in FIG. 2, The common-mode noise signal is input to the noise suppressing circuit 60 and removed through the operation described above and then amplified at a predetermined gain in the chrominance amplifying circuit 70. Therefore, common mode noise caused by a Y/C interference is removed from the amplified output signal OK as shown in FIG. 3D.

As described above, the noise suppressing device of the present invention removes switching noise included in a modulated color signal, thereby reducing Y/C interference.

Having illustrated and described the principles of the present invention in the context of the embodiment described above, it should be readily apparent to those skilled in the art that the invention can be modified in arrangement and detail without departing from such principles. For example, while the present invention is described above in the context of bipolar transistors, it should be readily understood that the present invention can be implemented using other technologies, such as Metal-Oxide Semiconductor (MOS) transistors, without departing from the scope and spirit of the present invention.

What is claimed is:

1. A noise suppressing circuit for removing a common-mode noise component signal included in a modulated color signal generated by a balanced modulating device employing a Gilbert multiplier, the noise suppressing circuit comprising:

a first transistor having a base, collector and emitter, wherein the base is configured to receive a complementary balanced-modulated signal generated by the balanced modulating device;

a first resistor coupled between a power terminal and the emitter of the first transistor;

a second transistor having a base, collector and emitter, wherein the base of the second transistor is configured to receive a balanced-modulated signal generated by the balanced modulating device;

a second resistor coupled between the power terminal and the emitter of the second transistor;

a third transistor having a base, collector and emitter, wherein the base of the third transistor is coupled to the collector of the first transistor, and the collector of the third transistor is coupled to the power terminal;

a fourth transistor having a base, collector and emitter, wherein the collector of the fourth transistor is coupled to the collector of the first transistor, the base of the fourth transistor is coupled to the emitter of the third transistor;

a third resistor coupled between the emitter of the fourth transistor and a ground terminal;

a fifth transistor having a base, collector and emitter, wherein the collector of the fifth transistor is coupled to the collector of the second transistor, the base of the fifth transistor is coupled to the base of the fourth transistor; and a fourth resistor coupled between the emitter of the fifth transistor and the ground terminal.

2. The noise suppressing circuit of claim 1 wherein:

the first and second transistors are bipolar PNP devices; and the third, fourth and fifth transistors are bipolar NPN devices.

3. The noise suppressing circuit of claim 1 wherein:

each of the first and second transistors are PMOS devices, wherein the base of each of the first and second transistors corresponds to a gate of a PMOS device, the collector corresponds to a drain of the PMOS device, and the emitter corresponds to a source of the PMOS device; and the third, fourth and fifth transistors are NMOS devices, wherein the base of each of the third, fourth and fifth transistors corresponds to a gate of an NMOS device, the collector corresponds to a drain of the NMOS device, and the emitter corresponds to a source of the NMOS device.

4. A balanced modulating device employing a Gilbert multiplier, the balance modulating device comprising:

a Gilbert multiplier configured to generate a balanced-modulated color signal and a complementary balanced-modulated color signal;

a noise suppressor configured to receive the balanced-modulated color signal and the complementary balanced-modulated color signal and remove a switching noise signal introduced into the balanced-modulated color signal and the complementary balanced-modulated color signal; and a color signal amplifier for amplifying a color signal output by said noise suppressor;

wherein said noise suppressor further comprises:

a first transistor having a base, collector and emitter, wherein the base is configured to receive a complementary balanced-modulated signal generated by the balanced modulating device;

a first resistor coupled between a power terminal and the emitter of the first transistor;

a second transistor having a base, collector and emitter, wherein the base of the second transistor is configured to receive a balanced-modulated signal generated by the balanced modulating device;

a second resistor coupled between the power terminal and the emitter of the second transistor;

a third transistor having a base, collector and emitter, wherein the base of the third transistor is coupled to the collector of the first transistor, and the collector of the third transistor is coupled to the power terminal;

a fourth transistor having a base, collector and emitter, wherein the collector of the fourth transistor is coupled to the collector of the first transistor, the base of the fourth transistor is coupled to the emitter of the third transistor;

a third resistor coupled between the emitter of the fourth transistor and a ground terminal;

a fifth transistor having a base, collector and emitter, wherein the collector of the fifth transistor is coupled to the collector of the second transistor, the base of the fifth transistor is coupled to the base of the fourth transistor; and a fourth resistor coupled between the emitter of the fifth transistor and the ground terminal.

5. A method for suppressing a common-mode noise signal included in a pair of differential balanced-modulated color signals generated by a balanced modulating device employing a Gilbert multiplier, the method comprising the steps:

inverse modulating a first current signal responsive to a complementary balanced-modulated color signal containing the common-mode noise signal;

inverse modulating a second current signal responsive to a balanced-modulated color signal containing the common-mode noise signal;

generating a common base current signal responsive to the first current signal;

driving a first current sink with the common base current signal to produce a third current signal;

subtracting the third current signal from the first current signal;

driving a second current sink with the common base current signal to produce a fourth current signal; and subtracting the fourth current signal from the second current signal in order to produce an output signal.

* * * * *

UNITED STATES PATENT AND TRADEMARK OFFICE
CERTIFICATE OF CORRECTION

PATENT NO.    : 5,959,491
DATED         : September 28, 1999
INVENTOR(S)   : Jae-sung Kang It is certified that error appears in the above-identified patent and that said Letters Patent is hereby corrected as shown below:

Title page,
Under Item [57], ABSTRACT, "5 claims" should read -- 6 claims --

Column 5,
Line 41, claims 1-6 should be as follows:

1. A noise suppressing circuit for removing a common-mode noise component signal included in a modulated color signal generated by a balanced modulating device employing a Gilbert multiplier, the noise suppressing circuit comprising:

a first transistor having a base, collector and emitter, wherein the base is configured to receive a complement of a balanced-modulated signal generated by the balanced modulating device;

a first resistor coupled between a power terminal and the emitter of the first transistor;

a second transistor having a base, collector and emitter, wherein the base of the second transistor is configured to receive said balanced-modulated signal generated by the balanced modulating device;

a second resistor coupled between the power terminal and the emitter of the second transistor;

a third transistor having a base, collector and emitter, wherein the base of the third transistor is coupled to the collector of the first transistor, and the collector of the third transistor is coupled to the power terminal;

a fourth transistor having a base, collector and emitter, wherein the collector of the fourth transistor is coupled to the collector of the first transistor, the base of the fourth transistor is coupled to the emitter of the third transistor;

a third resistor coupled between the emitter of the fourth transistor and a ground terminal;

a fifth transistor having a base, collector and emitter, wherein the collector of the fifth transistor is coupled to the collector of the second transistor, the base of the fifth transistor is coupled to the base of the fourth transistor; and     a fourth resistor coupled between the emitter of the fifth transistor and the ground terminal.

2. The noise suppressing circuit of claim 1 wherein:
    the first and second transistors are bipolar PNP devices; and
    the third, fourth and fifth transistors are bipolar NPN devices.

Claim 3 is cancelled.

UNITED STATES PATENT AND TRADEMARK OFFICE
CERTIFICATE OF CORRECTION

PATENT NO. : 5,959,491
DATED : September 28, 1999
INVENTOR(S) : Jae-sung Kang

It is certified that error appears in the above-identified patent and that said Letters Patent is hereby corrected as shown below:

Column 5 (cont'd),

3.    A balanced modulating device employing a Gilbert multiplier, the balanced modulating device comprising:

a Gilbert multiplier configured to generate a balanced-modulated color signal and a complement of the balanced-modulated color signal;

a noise suppressor configured to receive the balanced-modulated color signal and the complement of the balanced-modulated color signal and remove a switching noise signal introduced into the balanced-modulated color signal and the complement of the balanced-modulated color signal; and     a color signal amplifier for amplifying a color signal output by said noise suppressor;

wherein said noise suppressor comprises:

a first transistor having a base, collector and emitter, wherein the base is configured to receive a complement of a balanced-modulated signal generated by the balanced modulating device;

a first resistor coupled between a power terminal and the emitter of the first transistor;

a second transistor having a base, collector and emitter, wherein the base of the second transistor is configured to receive said balanced-modulated signal generated by the balanced modulating device;

a second resistor coupled between the power terminal and the emitter of the second transistor;

a third transistor having a base, collector and emitter, wherein the base of the third transistor is coupled to the collector of the first transistor, and the collector of the third transistor is coupled to the power terminal;

a fourth transistor having a base, collector and emitter, wherein the collector of the fourth transistor is coupled to the collector of the first transistor, the base of the fourth transistor is coupled to the emitter of the third transistor;

a third resistor coupled between the emitter of the fourth transistor and a ground terminal;

a fifth transistor having a base, collector and emitter, wherein the collector of the fifth transistor is coupled to the collector of the second transistor, the base of the fifth transistor is coupled to the base of the fourth transistor; and     a fourth resistor coupled between the emitter of the fifth transistor and the ground terminal.

UNITED STATES PATENT AND TRADEMARK OFFICE
CERTIFICATE OF CORRECTION

PATENT NO. : 5,959,491
DATED : September 28, 1999
INVENTOR(S) : Jae-sung Kang

It is certified that error appears in the above-identified patent and that said Letters Patent is hereby corrected as shown below:

Column 5 (cont'd),

4. A method for suppressing a common-mode noise signal included in a pair of differential balanced-modulated color signals generated by a balanced modulating device employing a Gilbert multiplier, the method comprising the steps:

inverse modulating a first current signal responsive to a complementary balanced-modulated color signal containing the common-mode noise signal;

inverse modulating a second current signal responsive to a balanced-modulated color signal containing the common-mode noise signal;

generating a common base current signal responsive to the first current signal;

driving a first current sink with the common base current signal to produce a third current signal;

subtracting the third current signal from the first current signal;

driving a second current sink with the common base current signal to produce a fourth current signal; and subtracting the fourth current signal from the second current signal in order to produce an output signal.

5. A noise suppressing circuit for removing a common-mode noise component signal included in a modulated color signal generated by a balanced modulating device employing a Gilbert multiplier, the noise suppressing circuit comprising:

a first transistor having a gate, drain and source, wherein the gate is configured to receive a balanced-modulated signal generated by the balanced modulating device;

a first resistor coupled between a power terminal and the source of the first transistor;

a second transistor having a gate, drain and source, wherein the gate of the second transistor is configured to receive said balanced-modulated signal generated by the balanced modulating device;

a second resistor coupled between the power terminal and the source of the second transistor;

a third transistor having a gate, drain and source, wherein the gate of the third transistor is coupled to the drain of the first transistor, and the drain of the third transistor is coupled to the power terminal;

a fourth transistor having a gate, drain and source, wherein the drain of the fourth transistor is coupled to the drain of the first transistor, the gate of the fourth transistor is coupled to the source of the third transistor;

UNITED STATES PATENT AND TRADEMARK OFFICE
CERTIFICATE OF CORRECTION

PATENT NO.    : 5,959,491
DATED         : September 28, 1999
INVENTOR(S)   : Jae-sung Kang It is certified that error appears in the above-identified patent and that said Letters Patent is hereby corrected as shown below:

Column 5 (cont'd), a third resistor coupled between the source of the fourth transistor and a ground terminal;

a fifth transistor having a gate, drain and source, wherein the drain of the fifth transistor is coupled to the drain of the second transistor, the gate of the fifth transistor is coupled to the gate of the fourth transistor; and     a fourth resistor coupled between the source of the fifth transistor and the ground terminal.

6.    The noise suppressing circuit of claim 5, wherein the first and second transistors are PMOS devices, and wherein the third, fourth, and fifth transistors are NMOS device.

Signed and Sealed this

Twenty-seventh Day of July, 2004

JON W. DUDAS
*Acting Director of the United States Patent and Trademark Office*